(12) United States Patent
Lu et al.

(10) Patent No.: US 11,294,577 B2
(45) Date of Patent: Apr. 5, 2022

(54) NON-VOLATILE MEMORY AND OPERATION METHOD THEREOF

(71) Applicant: UNITED MICROELECTRONICS CORP., Hsin-Chu (TW)

(72) Inventors: Hsiao-Hua Lu, Hsinchu County (TW); Hsin-Pang Lu, Hsinchu County (TW)

(73) Assignee: UNITED MICROELECTRONICS CORP., Hsin-Chu (TW)

( * ) Notice: Subject to any disclaimer, the term of this patent is extended or adjusted under 35 U.S.C. 154(b) by 44 days.

(21) Appl. No.: 16/831,716

(22) Filed: Mar. 26, 2020

(65) Prior Publication Data
US 2021/0263656 A1 Aug. 26, 2021

(30) Foreign Application Priority Data

Feb. 24, 2020 (TW) .................................. 109105833

(51) Int. Cl.
*G06F 3/06* (2006.01)
*G06F 11/08* (2006.01)
*G06F 16/22* (2019.01)

(52) U.S. Cl.
CPC ............ *G06F 3/0619* (2013.01); *G06F 3/065* (2013.01); *G06F 3/0653* (2013.01); *G06F 3/0679* (2013.01); *G06F 11/08* (2013.01); *G06F 16/221* (2019.01); *G06F 16/2282* (2019.01)

(58) Field of Classification Search
CPC .... G06F 3/0619; G06F 3/0679; G06F 3/0653; G06F 3/065; G06F 11/08; G06F 16/2282; G06F 16/221
See application file for complete search history.

(56) References Cited

U.S. PATENT DOCUMENTS

| | | | |
|---|---|---|---|
| 6,002,620 A | 12/1999 | Tran | |
| 6,259,636 B1* | 7/2001 | Fukuda | G11C 29/808 365/200 |
| 7,170,802 B2 | 1/2007 | Cernea | |
| 7,633,800 B2 | 12/2009 | Adusumilli | |
| 2002/0133769 A1* | 9/2002 | Cowles | G11C 29/44 714/719 |
| 2004/0090847 A1 | 5/2004 | Takeuchi | |
| 2007/0103978 A1* | 5/2007 | Conley | G11C 16/0483 365/185.09 |
| 2008/0181035 A1* | 7/2008 | Kawasumi | G11C 29/44 365/200 |
| 2015/0294741 A1* | 10/2015 | Zhang | G11C 29/82 365/185.12 |
| 2019/0391874 A1* | 12/2019 | Lien | G06F 3/0659 |

* cited by examiner

*Primary Examiner* — Hiep T Nguyen
(74) *Attorney, Agent, or Firm* — Winston Hsu

(57) ABSTRACT

A non-volatile memory includes a plurality of data storage units arranged in an array, a plurality of redundant data storage units arranged in at least one row and a plurality of redundant address storage units arranged in at least one row. A storage size of each of the data storage units is word. Each of the data storage units is addressable by a row address and a column address. One of the redundant data storage units in a first column is configured to substitute for one of the data storage units in a second column. One of the redundant address storage units in a third column is configured to record the row address representative of the substituted one of the data storage units.

20 Claims, 6 Drawing Sheets

NON-VOLATILE MEMORY AND OPERATION METHOD THEREOF

BACKGROUND OF THE INVENTION

1. Field of the Invention

The present invention relates to a non-volatile memory and operation method thereof, and more particularly, to a non-volatile memory and operation method capable of effectively utilizing resources.

2. Description of the Prior Art

Memory cells of a non-volatile memory may be damaged either from manufacture due to process or during operation of the non-volatile memory. Redundancy in a non-volatile memory may be used to substitute for defective or damaged memory cells so as to improve yield and reliability. However, a traditional non-volatile memory requires multiple redundant columns or multiple redundant rows to achieve sufficient yield. Besides, one storage column (or one storage row) is replaced by an entire redundant column (or a predetermined storage row) just because one memory cell of the storage column (or the storage row) is defective, which is disadvantageous to efficient use of resources. In addition, the management of redundancy involves a large amount of information exchange. Using an external controller to manage redundancy hinders miniaturization or operation speed enhancement.

SUMMARY OF THE INVENTION

In order to solve the above problems, the present invention provides a non-volatile memory and operation method capable of effectively utilizing resources.

The present invention discloses a non-volatile memory includes a plurality of data storage units, a plurality of redundant data storage units and a plurality of redundant address storage units. The plurality of data storage units are arranged in an array. A storage size of each of the plurality of data storage units is word size, respectively. Each of the plurality of data storage units is addressable by a row address and a column address. The plurality of redundant data storage units are arranged in at least one row. One of the plurality of redundant data storage units in a first column is configured to substitute for one of the plurality of data storage units in a second column. The plurality of redundant address storage units are arranged in at least one row. One of the plurality of redundant address storage units in a third column is configured to record a row address representative of the substituted one of the plurality of data storage units.

The present invention further discloses an operation method includes substituting one of a plurality of redundant data storage units in a first column for one of a plurality of data storage units in a second column; and recording a row address representative of the substituted one of the plurality of data storage units in one of a plurality of redundant address storage units in a third column. The plurality of redundant data storage units are arranged in at least one row. The plurality of data storage units are arranged in an array. A storage size of each of the plurality of data storage units is word size, respectively. Each of the plurality of data storage units is addressable by a row address and a column address. The plurality of redundant address storage units are arranged in at least one row.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
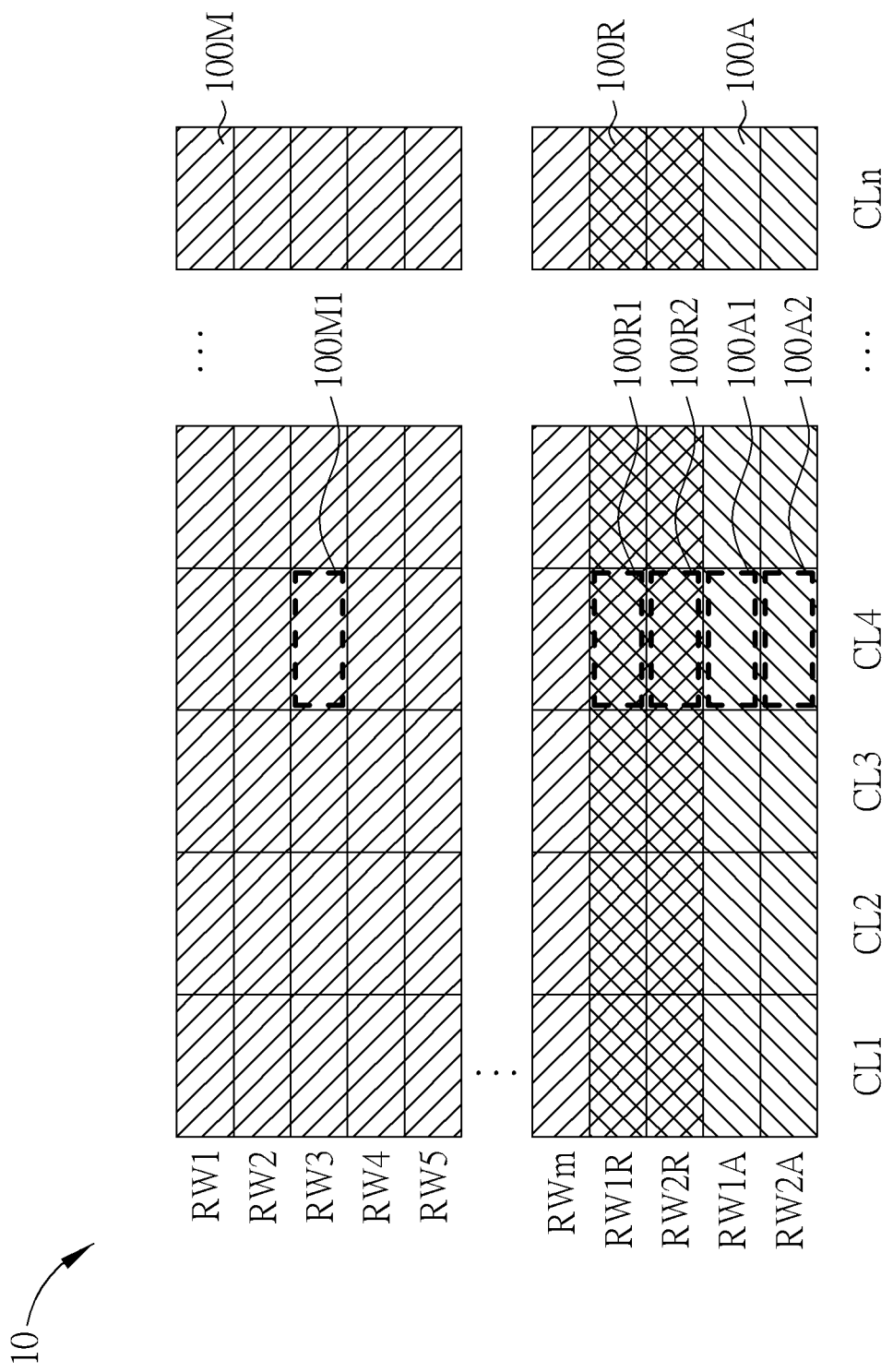
FIG. 1 is a schematic diagram of a non-volatile memory according to an embodiment of the present invention.

FIG. 1 is a schematic diagram of a non-volatile memory 10 according to an embodiment of the present invention. The non-volatile memory 10 may substantially include a plurality of data storage units 100M, a plurality of redundant data storage units 100R and a plurality of redundant address storage units 100A. The data storage units 100M, the redundant data storage units 100R, and the redundant address storage units 100A are arranged in an array. The data storage units 100M are configured to store data. The redundant data storage units 100R are configured to substitute for the data storage units 100M. The redundant address storage units 100A are configured to record row addresses of the data storage units 100M. For example, one data storage unit 100M indicated by a thick dashed box in FIG. 1 (namely, a data storage unit 100M1) is defective or damaged and cannot store data. One redundant data storage unit 100R indicated by a thick dashed box in FIG. 1 (namely, a redundant data storage unit 100R1) may replace the defective or damaged data storage unit 100M1. One redundant address storage unit 100A indicated by a thick dashed box in FIG. 1 (namely, a redundant address storage unit 100A1) may record a row address of the damaged data storage unit 100M1 being substituted.

In short, in FIG. 1, the data storage unit 100M1, the redundant data storage unit 100R1, and the redundant address storage unit 100A1 are located in the same column (namely, a column CL4). Therefore, when the redundant data storage unit 100R1 substitutes for the damaged data storage unit 100M1, the redundant address storage unit 100A1 only records the row address of the damaged data storage unit 100M1 without keeping any record of a column address of the damaged data storage unit 100M1. Because there is no need to additionally record the column address of the damaged data storage unit 100M, resources can be exploited effectively.

Specifically, the data storage units 100M, the redundant data storage units 100R, and the redundant address storage units 100A in FIG. 1 are spatially and functionally associated. In some embodiments, the redundant data storage unit 100R1 is utilized for replacing the damaged data storage unit 100M1, and the redundant data storage unit 100R1 and the data storage unit 100M1 are located in the same column (namely, the column CL4). Consequently, the data storage unit 100M1 and the redundant data storage unit 100R1 are spatially and functionally associated. The redundant data storage unit 100R1 and the redundant address storage unit 100A1 are located in the same column (namely, the column CL4), and are configured to solve a problem that the data storage units 100M may be defective or damaged. Therefore, each of the redundant data storage units 100R (for instance, the redundant data storage unit 100R1) is spatially and functionally associated with one of the redundant address storage units 100A (for instance, the redundant address storage unit 100A1). In other embodiments, one of the redundant data storage units 100R located in a first column is utilized to substitute for one of the data storage units 100M located in a second column, and one of the redundant address storage units 100A located in a third column is utilized to record a row address of the data storage unit 100M being substituted. The first, second, and third columns may be aligned (that is, to be in the same column). Alternatively, the first, second, and third columns may be nonaligned (that is, to be in different columns), but have a predetermined association with each other and are spatially related. For example, the first, second, and third columns may be arranged in an ascending or descending order. In some embodiments, one of the redundant data storage units 100R in the first column and a first row (such as the redundant data storage unit 100R1 in the column CL4 and a row RW1R) and one of the redundant address storage units 100A in the third column and a second row (such as the redundant address storage unit 100A1 located in column CL4 and a row RW1A) are associated with the same data storage unit (such as the data storage unit 100M1 located in the column CL4 and a row RW3) and thus are associated with each other. Based on the relationship among the data storage units 100M, the redundant data storage units 100R, and the redundant address storage units 100A, no column addresses of the data storage units 100M are stored in any of the redundant address storage units 100A. In addition, there is no need to record the column addresses of the data storage units 100M in the non-volatile memory 10, such that resources can be effectively utilized. In some embodiments, an address of one of the data storage units 100M may be 16 bits. The column address of one of the data storage units 100M may be 6 bits, and the row address of one of the data storage units 100M may be 10 bits. Storing only the 10-bit row address instead of the 16-bit full address can reduce circuit complexity.

The data storage units 100M may be arranged in a plurality of columns (for example, columns CL1 to CLn, where n is a positive integer) and a plurality of rows (for example, rows RW1 to RWm, where m is a positive integer). To minimize the size, the redundant data storage units 100R and the redundant address storage units 100A are respectively arranged in a plurality of columns and at least one row. For example, as shown in FIG. 1, the redundant data storage units 100R and the redundant address storage units 100A are respectively arranged into two rows. Each of the data storage units 100M is correspondingly addressable by a column address and a row address. That is to say, a location of one of the data storage units 100M can be identified by a column address and a row address. For example, the data storage unit 100M1 indicated by the thick dashed box in FIG. 1 is located in the row CL4 and the row RW3, and the data storage unit 100M1 can be identified by the row address corresponding to the row CL4 and the column address corresponding to the row RW3.

Each of the data storage units 100M may include a plurality of memory cells. In some embodiments, the storage size of each of the data storage units 100M is word size; similarly, the storage size of each of the redundant data storage units 100R is also word size. In other words, the non-volatile memory 10 adopts word redundancy to perform self repair and auto repair rather than column redundancy or row redundancy. When one data storage unit 100M in a row is defective, there is no need to substitute the whole row of redundant data storage units 100R for the whole row of data storage units 100M, but one redundant data storage unit 100R replaces one data storage unit 100M instead. This may effectively utilize resources and reduce costs. In other embodiments, the storage size of each of the data storage units 100M and the redundant data storage units 100R may be a plurality of bits respectively.

Figure 2:
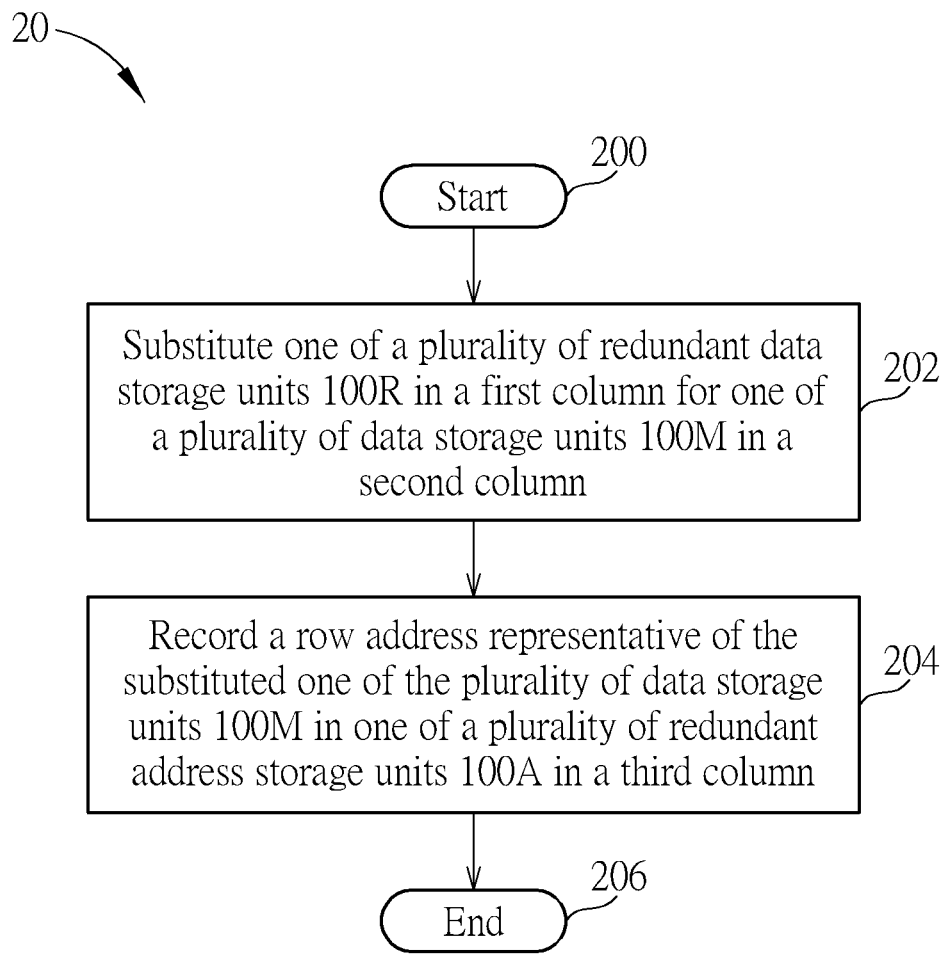
FIG. 2 and FIG. 3 are flowcharts of operation methods for write operations according to an embodiment of the present invention.

FIG. 2 is a flowchart of an operation method 20 for a write operation according to an embodiment of the present invention. The operation method 20 may be utilized in the non-volatile memory 10 to achieve word redundancy. The operation method 20 includes following steps:

Step 200: Start.

Step 202: Substitute one of a plurality of redundant data storage units 100R in a first column for one of a plurality of data storage units 100M in a second column.

Step 204: Record a row address representative of the substituted one of the plurality of data storage units 100M in one of a plurality of redundant address storage units 100A in a third column.

Step 206: End.

In step 202, one of the redundant data storage units 100R located in a predetermined column replaces one of the data storage units 100M located in a predetermined column. In other words, data (for example, a word) is written into one of the redundant data storage unit 100R in a predetermined column instead of the data storage unit 100M. For example, in the substitution operation of step 202, the redundant data storage unit 100R1 located in the column CL4 is substituted for the data storage unit 100M1 in the column CL4 that is unable to be written. Consequently, the word would be stored in the available redundant data storage unit 100R1 rather than the unwritable data storage unit 100M1 (unable to be written).

In step 204, one of the redundant address storage units 100A in a predetermined row records a row address of the substituted one of the data storage units 100M. That is, the row address of the data storage unit 100M is written into one of the redundancy address storage units 100A located in a predetermined column. For example, since the redundant data storage unit 100R1 located in the column CL4 and the row RW1R is spatially associated with the redundant address storage unit 100A1 located in the column CL4 and the row RW1A, when the redundant data storage unit 100R1 replaces the data storage unit 100M1, the row address of the unwritable data storage unit 100M1 of the data storage unit 100M is stored in the redundant address storage unit 100A1 during the record operation of step 204. When the redundant data storage unit 100R1 substitutes for the damaged data storage unit 100M1, the redundant address storage unit 100A1 merely records the row address of the damaged data storage unit 100M1, and does not record the column address of the damaged data storage unit 100M1. Without recording the column address of the damaged data storage unit 100M1, resources can be effectively utilized.

Figure 3:
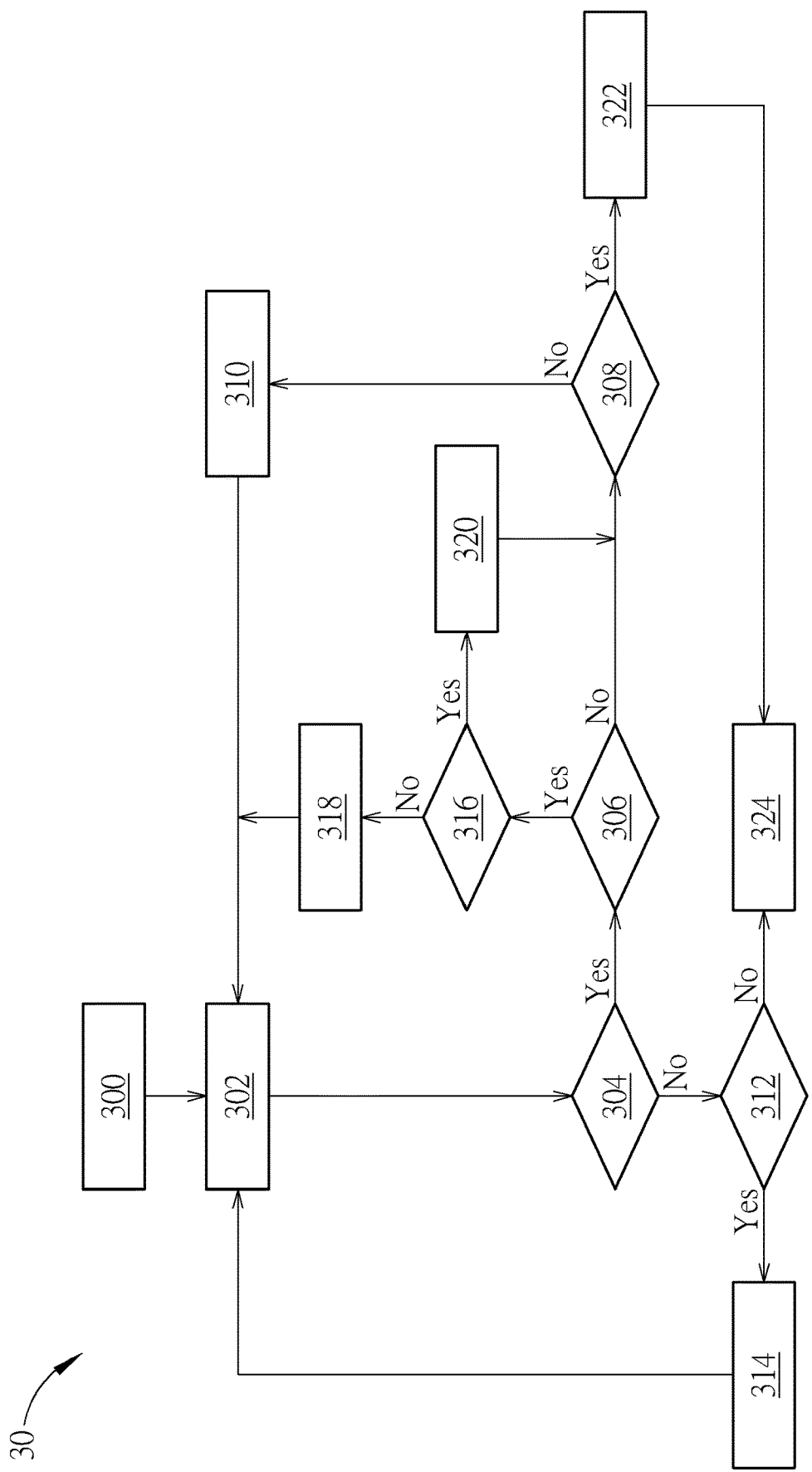

FIG. 3 is a flowchart of an operation method 30 for a write operation according to an embodiment of the present invention. The operation method 30 may be used for the non-volatile memory 10 to achieve word redundancy. The operation method 30 includes following steps:

Step 300: Start, and set parameters REDRPR, REDADD to a first determination value.

Step 302: Write a word into one of a plurality of data storage units 100M or one of a plurality of redundant data storage units 100R, or store a row address of an unwritable one of the plurality of data storage units 100M into one of a plurality of redundant address storage units 100A.

Step 304: Determine whether the word or the row address is stored successfully or not. If yes, go to Step 306; otherwise, go to Step 312.

Step 306: Determine whether the word is stored in one of the plurality of data storage units 100M instead of one of the plurality of redundant data storage units 100R. If yes, go to Step 308; otherwise, go to Step 316.

Step 308: Determine whether an address of the data storage unit corresponds to a last one of the plurality of data storage units 100M. If yes, go to Step 322; otherwise, go to Step 310.

Step 310: Move to process a next data storage unit of the plurality of data storage units 100M, and go to Step 302.

Step 312: Determine whether any of the plurality of redundant data storage units 100R in a predetermined column is available, or whether the unwritable data storage unit 100M has been substituted successfully. If yes, go to Step 314; otherwise, go to Step 324.

Step 314: Trigger a substitution operation and set the parameter REDRPR to a second determination value. Go to Step 302.

Step 316: Determine whether the row address representative of the substituted one of the plurality of data storage units 100M is recorded. If yes, go to Step 320; otherwise, go to Step 318.

Step 318: Trigger a record operation and set the parameter REDADD to the second determination value. Go to Step 302.

Step 320: Reset the parameters REDRPR and REDADD to the first determination value. Go to Step 308.

Step 322: Reset the parameters REDRPR and REDADD to the first determination value. Go to Step 324.

Step 324: End.

In step 300, the parameters REDRPR and REDADD may be set to a first determination value, and the first determination value may be set to 0. In step 302, a word may be written into, for example, one of the data storage units 100M located in the second column (for instance, the data storage unit 100M1 located in the column CL4). In step 304, whether the word is successfully stored is determined. For example, whether the word is successfully stored in the data storage unit 100M1 located in the column CL4 is determined in step 304. In step 304, the word may be compared with content stored in the data storage unit 100M1 in the column CL4. When the word is different from the content stored in the data storage unit 100M1, it is determined that the word has been stored unsuccessfully. For example, the data storage unit 100M1 located in the column CL4 may be damaged, so the word cannot be stored in the data storage unit 100M1 successfully. When the word is the same as the content stored in the data storage unit 100M1, it is determined that the word is successfully stored.

If the word is determined to be successfully stored in the data storage unit 100M1 located in the column CL4 in step 304, whether the word is stored in one of the data storage units 100M or one of the redundant data storage units 100R is then determined in step 306. In other words, whether the parameter REDRPR is equal to the second determination value is determined, and the second determination value may be set to 1. If it is determined in step 306 that the word is stored in the data storage unit 100M1 (that is, the parameter REDRPR is not equal to 1), whether an address of the data storage unit 100M1 corresponds to a last one of the data storage units 100M it is determined in step 308. For example, whether a column address of the data storage unit 100M1 is a column address of the data storage units 100M in the last column is determined in step 308. If it is determined in step 308 that the data storage unit 100M1 is not the last one of the data storage units 100M, one of the data storage units 100M next to the data storage unit 100M1 is processed in step 310, which directs to step 302. Therefore, in step 310, a parameter ADDR may be set to ADDR+1 (that is, ADDR=ADDR+1, where the parameter ADDR may correspond to a column address of the next data storage unit 100M). If it is determined in step 308 that the data storage unit 100M1 is the last one in the data storage units 100M, the parameters REDRPR and REDADD are reset to the first determination value in step 322, which directs to step 324.

If it is determined in step 304 that the word cannot be successfully stored in the data storage unit 100M1 located in the column CL4, whether any of the redundant data storage units 100R located in a predetermined column is available or whether the unwritable data storage unit 100M has been successfully substituted is determined in step 312. In step 312, "available" means that the redundant data storage unit 100R is undamaged, or that no data is stored in the redundant data storage unit 100R to make the redundant data storage unit 100R unused. That is to say, whether the parameters REDRPR, REDADD, and NORED are respectively equal to the first determination value is determined in step 312. For example, whether anyone of the redundant data storage units 100R located in the column CL4 (for instance, the redundant data storage unit 100R1) is available is determined in step 312. Since the redundant data storage units 100R in the column CL4 (for instance, the redundant data storage unit 100R1) are spatially associated with the data storage unit 100M1 in the column CL4, the redundant data storage units 100R in the column CL4 meet requirements of being located in a predetermined column. If it is determined in step 312 that the redundant data storage units 100R located in the column CL4 are unavailable, the substitution operation cannot be completed. In such a situation, step 324 is then performed. Alternatively, whether the unwritable data storage unit 100M1, which is unable to be written, has been successfully substituted is determined in step 312. If it is determined in step 312 that the unwritable data storage unit 100M1 has been successfully replaced, there is no need to perform another substitution operation. Consequently, step 324 is then performed. On the contrary, if it is determined in step 312 that one of the redundant data storage units 100R located in column CL4 is available or the unwritable data storage unit 100M1, which fails to be written, is substituted unsuccessfully, a substitution operation is triggered and the parameter REDRPR is set to the second determination value in step 314.

The substitution operation may be triggered in step 314, which directs to step 302. As a result, an available one of the redundant data storage unit 100R located in a specific column (such as the redundant data storage unit 100R1 in the column CL4) substitutes for the unwritable data storage unit 100M1 that fails to be written. Accordingly, when the word cannot be written into the data storage unit 100M1 in the column CL4, the word would be stored in the available redundant data storage unit 100R1 instead of the unwritable data storage unit 100M1. That is to say, the parameter REDRPR is set to the second determination value in step 314. After step 314, the word is written into one of the redundant data storage units 100R located in the first column (for instance, the redundant data storage unit 100R1 located in the column CL4) in step 302. Subsequently, whether the word is successfully stored is determined in step 304. For example, whether the word is successfully stored in the redundant data storage unit 100R1 located in the column CL4 is determined in step 304. The word may be compared with the content stored in the redundant data storage unit 100R1 in the column CL4. When the word is different from the content stored in the redundant data storage unit 100R1, it is determined that the word has been stored unsuccessfully. For example, the redundant data storage unit 100R1 in the column CL4 may be damaged so that the word cannot be stored in the redundant data storage unit 100R1 successfully.

If it is determined in step 304 that the word cannot be successfully stored in the redundant data storage unit 100R1 in the column CL4, whether another one of the redundant data storage units 100R in the predetermined column is available or whether the unwritable data storage unit 100M has been successfully substituted is determined in step 312. For example, whether another one of the redundant data storage units 100R located in the column CL4 (for instance, a redundant data storage unit 100R2) is available is determined in step 312. Since the redundant data storage unit 100R2 located in the column CL4 is spatially associated to the data storage unit 100M1 located in the column CL4, the redundant data storage unit 100R2 in the column CL4 meets the requirements of being located in a predetermined column. If it is determined in step 312 that none of the redundant data storage units 100R located in the column CL4 is available, the substitution operation cannot be completed. In such a situation, step 324 is then performed. On the other hand, if it is determined in step 312 that one of the redundant data storage units 100R located in column CL4 is available or the unwritable data storage unit 100M1, which cannot be written, is substituted unsuccessfully, the substitution operation is triggered again in step 314. Accordingly, step 302 is performed, and another available one of the redundant data storage units 100R in the predetermined column (such as the redundant data storage unit 100R2 in the column CL4) substitutes for the unwritable data storage unit 100M1. Therefore, the word would be stored in the available redundant data storage unit 100R2 instead of the data storage unit 100M1 that cannot be written. After step 314, the word is written into the (another) available one of the redundant data storage units 100R located in the predetermined column (such as the redundant data storage unit 100R2 in the column CL4) in step 302.

If the word is determined to be successfully stored in the redundant data storage unit 100R1 in the column CL4 in step 304, whether the word is stored in one of the data storage units 100M or one of the redundant data storage units 100R is then determined in step 306. If it is determined in step 306 that the word is stored in the redundant data storage unit 100R (that is, the parameter REDRPR is equal to 1), whether a row address of the substituted data storage unit 100M1 has been recorded is determined in step 316. That is to say, whether the parameter REDADD is equal to the second determination value is determined in step 316. If it is determined in step 316 that the row address of the substituted data storage unit 100M1 has been recorded (that is, the parameter REDADD is equal to 1), the parameters REDRPR and REDADD are reset to the first determination value in step 320. Step 308 is then performed, and whether the address of the data storage unit 100M1 corresponds to the last data storage unit 100M is determined. If it is determined in step 316 that the row address of the substituted data storage unit 100M1 is not recorded (that is, the parameter REDADD is not equal to 1), the record operation is triggered in step 318.

In step 318, the record operation is triggered. Step 302 is then performed, and the row address of the unwritable data storage unit 100M1 of the data storage units 100M is stored in one of the redundant address storage units 100A located in a predetermined row and a predetermined column (for example, the redundant address storage unit 100A1 located in the column CL4 and the row RW1A). Since the redundant data storage unit 100R1 located in column CL4 and the row RW1R is spatially associated with the redundant address storage unit 100A1 located in column CL4 and the row RW1A, the redundant address storage units 100A1 located in column CL4 and the row RW1A meets the requirements of being located in a predetermined row and a predetermined column. After step 318, the row address of the unwritable data storage unit 100M1 may be stored in one of the plurality of redundant address storage units 100A in the third row (for example, the redundancy address storage unit 100A1 in the column CL4) in step 302. Subsequently, whether the row address is successfully stored is determined in step 304. For example, whether the row address is successfully stored in the redundant address storage unit 100A1 in the column CL4 is determined in step 304. The row address may be compared with the content stored in the redundant address storage unit 100A1 in the column CL4. When the row address is different from the content stored in the redundant address storage unit 100A1, it is determined that the row address is stored unsuccessfully. For example, the redundant address storage unit 100A1 in the column CL4 may be damaged so that the row address cannot be stored in the redundant address storage unit 100A1 successfully.

If it is determined that the row address cannot be successfully stored in step 304 and that another one of the redundant data storage units 100R located in the predetermined column is available or that the unwritable data storage unit 100M1 is substituted unsuccessfully in step 312, the substitution operation is triggered again in step 314. Step 302 is then performed, and another available one of the redundant data storage units 100R located in a predetermined column (such as the redundant data storage unit 100R2 in the column CL4) replace the unwritable data storage unit 100M1. In other words, each of the redundant data storage units 100R (for instance, the redundant data storage unit 100R1) is spatially and functionally associated with one of the redundant address storage units 100A (for instance, the redundant address storage unit 100A1). Consequently, when the word cannot be written into the redundant data storage unit 100R1 or the row address of the data storage unit 100M1 cannot be written into the redundant address storage unit 100A1, another available one of the redundant data storage units 100R in the predetermined column (such as the redundant data storage unit 100R2 in the column CL4) is substituted for the data storage unit 100M1 that is unable to be written. As a result, the word would be stored in the available redundant data storage unit 100R2 instead of the redundant data storage unit 100R1; the row address of the data storage unit 100M1 would be stored in the available redundant address storage unit 100A2 instead of the unwritable redundant address storage unit 100A1. After step 314, the word is written into the (another) available one of the redundant data storage units 100R located on the predetermined column (such as the redundant data storage unit 100R2 in the column CL4) in step 302. If it is determined that the word is successfully stored in the redundant data storage unit 100R2 located at column CL4 in step 304, that the word is stored in the redundant data storage unit 100R2 (that is, the parameter REDRPR is equal to 1) in step 306, and that the row address of the substituted data storage unit 100M1 is not recorded (that is, the parameter REDADD is not equal to 1) in step 316, the record operation is triggered again in step 318. Step 302 is then performed, and the row address of the unwritable data storage unit 100M1 of the data storage units 100M is stored in one of the redundant address storage units 100A, which is located in the predetermined row and the predetermined column and different from the redundant address storage unit 100A1 (namely, the redundant address storage unit 100A2 located in the column CL4 and the row RW2A). Since the redundant data storage unit 100R2 located in the column CL4 and the row RW2R is spatially associated with the redundant address storage unit 100A2 located in the column CL4 and the row RW2A, the redundant address storage unit 100A2 in the column CL4 and the row RW2A meets the requirements of being located in the predetermined row and the predetermined column.

Figure 4:
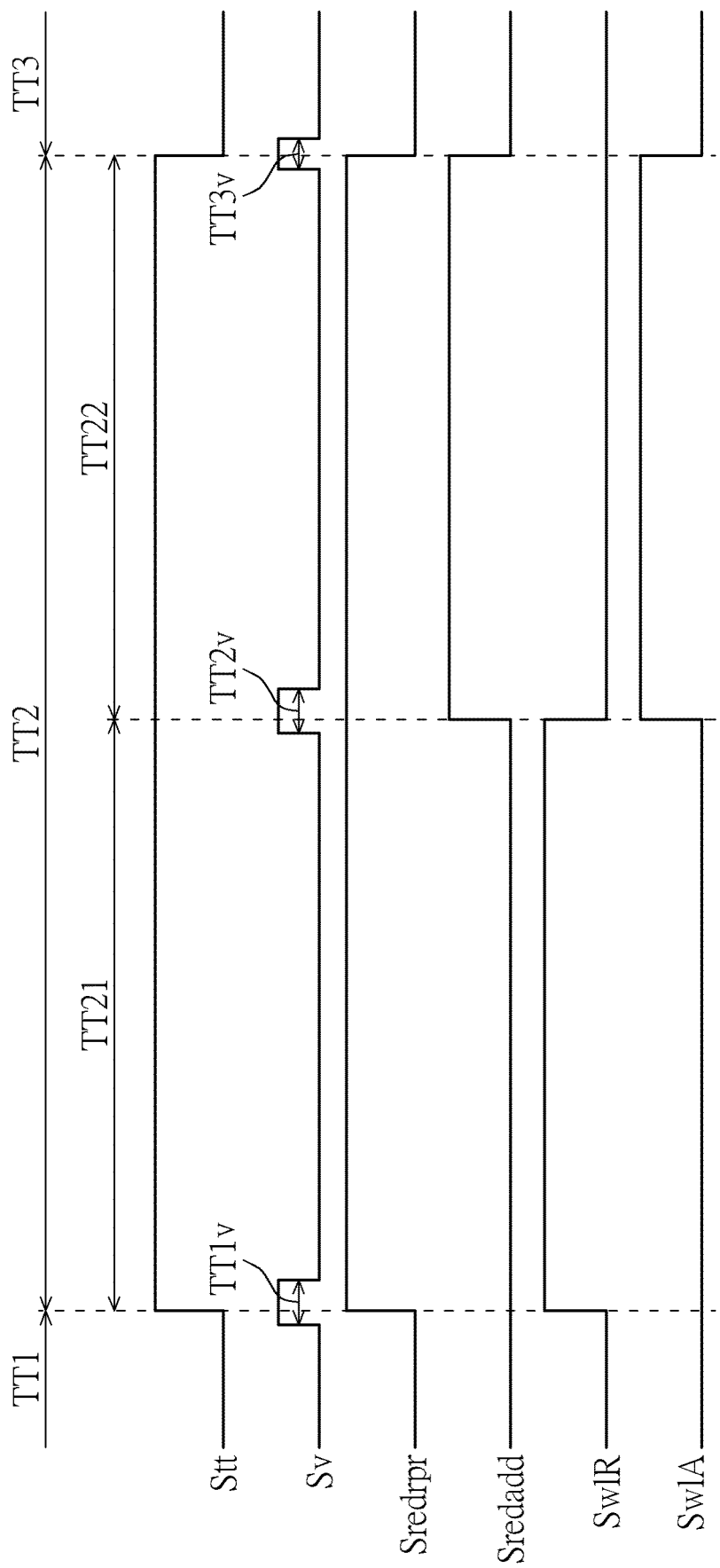
FIG. 4 is a timing diagram of the operation method shown in FIG. 3 according to an embodiment of the present invention.

FIG. 4 is a timing diagram of the operation method 30 shown in FIG. 3 according to an embodiment of the present invention. As shown in FIG. 4, a period TT2 may be divided into periods TT21 and TT22. An operation signal Stt is at a high level during the period TT2. During the period TT1 before the period TT2, a parameter signal Sredrpr corresponding to the parameter REDRPR is at a low level, and a parameter signal Sredadd corresponding to the parameter REDADD is at a low level. Accordingly, the parameters REDRPR and REDADD are set to the first determination value corresponding to step 300. During a period TT1v, a verification signal Sv is at a high level for determining, which corresponds to step 304. For example, whether a word is successfully stored in the data storage unit 100M1 is determined when the verification signal Sv is at the high level.

During the period TT21, the parameter signal Sredrpr is at a high level, such that the parameter REDRPR is set to the second determination value corresponding to step 314. A redundant data word line (WL) signal SwlR is at a high level, and one word may be written into one of the redundant data storage units 100R corresponding to the redundant data word line signal SwlR (for example, the redundant data storage unit 100R1 located at in the column CL4 and the row RW1R) corresponding to Step 302. During a period TT2v, the verification signal Sv is at a high level for determining, which corresponds to step 304. For example, whether a word is successfully stored in the redundant data storage unit 100R1 is determined when the verification signal Sv is at the high level.

During the period TT22, the parameter signal Sredadd is at a high level as well, and the parameter REDRPR is set to the second determination value corresponding to step 318. A redundant address word line signal SwlA is at a high level, and the row address of the unwritable data storage unit 100M1 is stored in one of the redundant address storage units 100A corresponding to the redundant address word line signal SwlA (for example, the redundant address storage unit 100A1 corresponding to the redundant data storage unit 100R1) corresponding to step 302. Because there is no need to record the column address of the damaged data storage unit 100M1, resources can be effectively utilized. During a period TT3v, the verification signal Sv is at a high level for determining, which corresponds to step 304. For example, whether the row address of the data storage unit 100M1 is successfully stored in the redundant address storage unit 100A1 is determined when the verification signal Sv is at the high level. In a period TT3 after the period TT2, the parameter signal Sredrpr is at a low level and the parameter signal Sredadd is at a low level, such that the parameters REDRPR and REDADD are set to the first determination value corresponding to step 320.

Figure 5:
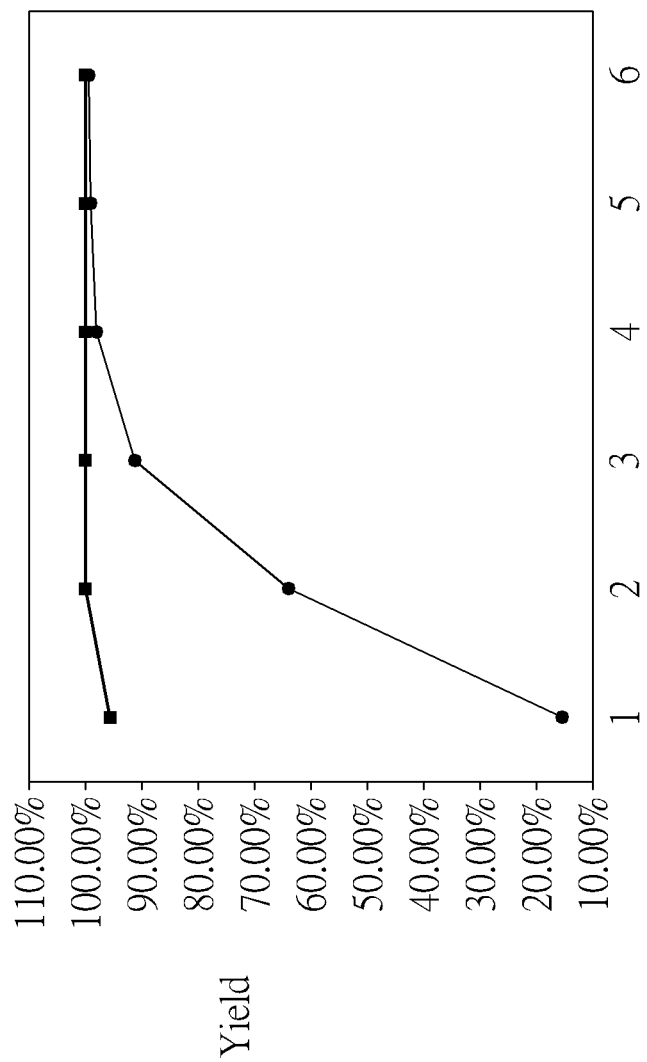
FIG. 5 is a schematic diagram of a comparison between yields of using conventional row redundancy and yields of using word redundancy according to an embodiment of the present invention.

FIG. 5 is a schematic diagram illustrating a comparison between yields of using conventional row redundancy and yields of using word redundancy according to an embodiment of the present invention. A thick solid line in FIG. 5 represents a relationship between the yields and the number of the redundant data storage units 100R in each row in a block according to an embodiment of the present invention. A thin solid line in FIG. 5 represents a relationship between the conventional yields and the number of redundant rows in a block conventionally. By means of word redundancy, the present invention only requires two rows of redundant data storage units 100R (that is, merely two redundant data storage units 100R are disposed in one column), and the yields rise to 100%. That is to say, the yields of the non-volatile memory 10 shown in FIG. 1 can reach 100%. Even if there is merely one row of the redundant data storage units 100R (that is, one redundant data storage unit 100R is provided for each column), the yield of the present invention is greater than 95%. In comparison, the conventional row redundancy manner requires more than six redundant rows to achieve a yield close to 100%.

Figure 6:
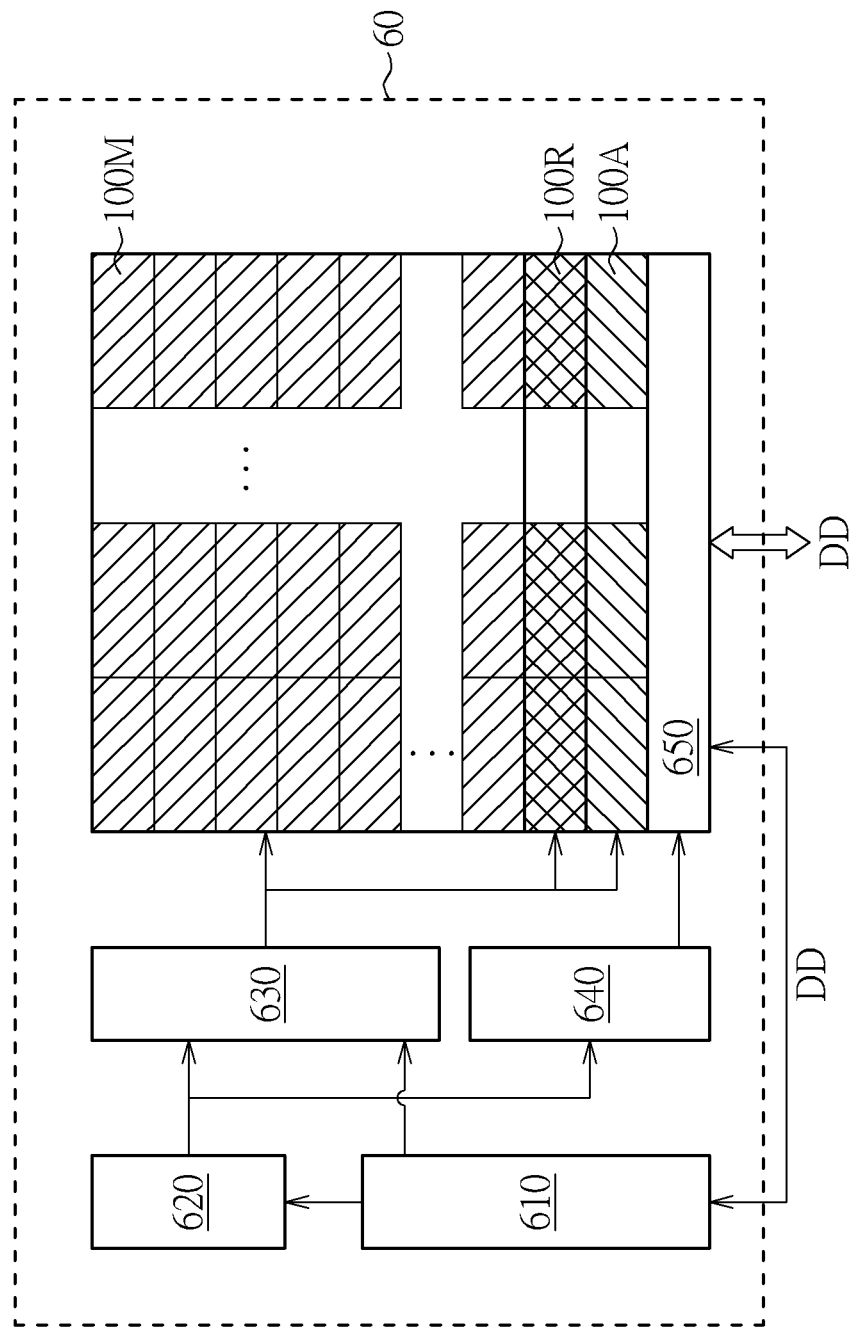
FIG. 6 is a schematic diagram of a non-volatile memory according to an embodiment of the present invention.

FIG. 6 is a schematic diagram of a non-volatile memory 60 according to an embodiment of the present invention. The structure of the non-volatile memory 60 shown in FIG. 6 is similar to that of the non-volatile memory 10 shown in FIG. 1, so the same numerals and notations denote the same components in the following description. Different from the non-volatile memory 10, the non-volatile memory 60 may further include a control circuit 610, an address register 620, a row decoder 630, a column decoder 640, and an input-output circuit 650. The control circuit 610 may be configured to control write operation of the non-volatile memory 60, such as the operation method 20 shown in FIG. 2 or the operation method 30 shown in FIG. 3. The control circuit 610 is embedded in the non-volatile memory 60. Therefore, in some embodiments, the present invention excludes the use of an external controller to control the write operation of the non-volatile memory 60, which is beneficial to miniaturization and operation speed enhancement. The row decoder 630 and the column decoder 640 respectively decode row addresses and column addresses output by the address register 620 so as to select data storage units 100M, redundant data storage units 100R, or redundancy address storage units 100A in a predetermined row and a predetermined column. The row decoder 630 may be connected to a plurality of word lines of the non-volatile memory 60. The input-output circuit 650 may be connected to a plurality of bit lines (BL) of the non-volatile memory 60. By means of the input-output circuit 650, data DD may be written into the data storage units 100M, the redundant data storage units 100R, or the redundant address storage units 100A. By means of the input-output circuit 650, the data DD may be read from the data storage units 100M, the redundant data storage units 100R, or the redundancy address storage units 100A. The input-output circuit 650 may also output the data DD to outside (that is, not within the non-volatile memory 60). In some embodiments, the data DD to be written is 32 bits. The data storage units 100M, the redundant data storage units 100R, or the redundant address storage units 100A are arranged in 64 columns. The non-volatile memory 60 includes 2048 bit lines.

In summary, the present invention adopts word redundancy to perform self repair and automatic repair. The storage size of each of the data storage units 100M is word size. When one of the memory cells or the data storage units 100M in a predetermined row is defective, one redundant data storage unit 100R is substituted for one data storage unit 100M instead of replacing a whole row of data storage units 100M with a whole row of redundant data storage units 100R. As a result, resources can be effectively utilized and costs can be reduced. In addition, when a redundant data storage unit 100R of the present invention replaces a damaged data storage unit 100M, a redundant address storage unit 100A only records a row address of the damaged data storage unit 100M without recording the column address of the damaged data storage unit 100M. Because there is no need to additionally record the column address of the damaged data storage unit 100M, the resources can be effectively utilized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-volatile memory, comprising:
   a plurality of data storage units, arranged in an array, wherein storage size of each of the plurality of data storage units is word size respectively, and each of the plurality of data storage units is addressable by a row address and a column address;
   a plurality of redundant data storage units, arranged in at least one row, wherein one of the plurality of redundant data storage units in a first column is configured to substitute for one of the plurality of data storage units in a second column; and
   a plurality of redundant address storage units, arranged in at least one row, wherein one of the plurality of redundant address storage units in a third column is configured to record a row address representative of the substituted one of the plurality of data storage units.

2. The non-volatile memory of claim 1, wherein the first column, the second column and the third column are aligned.

3. The non-volatile memory of claim 1, wherein each of the plurality of redundant address storage units is spatially and functionally associated with one of the plurality of redundant data storage units.

4. The non-volatile memory of claim 1, wherein one of the plurality of redundant data storage units in the first column and a first row is associated with one of the plurality of redundant address storage units in the third column and a second row.

5. The non-volatile memory of claim 1, wherein none of column addresses of the plurality of data storage units is stored in any of the plurality of redundant address storage units.

6. The non-volatile memory of claim 1, wherein the plurality of data storage units are arranged to two rows, and the plurality of redundant address storage units are arranged to two rows.

7. The non-volatile memory of claim 1 further comprising:
   a control circuit, configured to control write operation of the non-volatile memory, wherein the write operation comprises:
      writing a word into one of the plurality of redundant data storage units in the first column when the word fails to be written into one of the plurality of data storage units in the second column; and
      storing the row address representative of the unwritable one of the plurality of data storage units into one of the plurality of redundant address storage units in the third column.

8. An operation method, comprising:
   substituting one of a plurality of redundant data storage units in a first column for one of a plurality of data storage units in a second column, wherein the plurality of redundant data storage units are arranged in at least one row, the plurality of data storage units are arranged in an array, a storage size of each of the plurality of data storage units is word size respectively, and each of the plurality of data storage units is addressable by a row address and a column address; and
   recording a row address representative of the substituted one of the plurality of data storage units in one of a plurality of redundant address storage units in a third column, wherein the plurality of redundant address storage units are arranged in at least one row.

9. The operation method of claim 8, wherein the first column, the second column and the third column are aligned.

10. The operation method of claim 8, wherein each of the plurality of redundant address storage units is spatially and functionally associated with one of the plurality of redundant data storage units.

11. The operation method of claim 8, wherein one of the plurality of redundant data storage units in the first column and a first row is associated with one of the plurality of redundant address storage units in the third column and a second row.

12. The operation method of claim 8, wherein none of column addresses of the plurality of data storage units is stored in any of the plurality of redundant address storage units.

13. The operation method of claim 8, wherein the plurality of data storage units are arranged to two rows, and the plurality of redundant address storage units are arranged to two rows.

14. The operation method of claim 8, wherein the plurality of data storage units, the plurality of redundant data storage units, the plurality of redundant address storage units and a control circuit are disposed in a non-volatile memory, and the control circuit is configured to control write operation of the non-volatile memory.

15. The operation method of claim 8, wherein the step of substituting the one of the plurality of redundant data storage units in the first column for the one of the plurality of data storage units in the second column comprises:
   writing a word into the one of the plurality of data storage units in the second column;
   determining whether the word is successfully stored in the one of the plurality of data storage units in the second column; and
   writing the word into the one of the plurality of redundant data storage units in the first column when the word fails to be written into the one of the plurality of data storage units in the second column.

16. The operation method of claim 15, wherein the step of determining whether the word is successfully stored in the one of the plurality of data storage units in the second column comprises:

comparing the word to content stored in the one of the plurality of data storage units in the second column; and determining the word is unsuccessfully stored in the one of the plurality of data storage units in the second column when the word differs from the content stored in the one of the data storage units.

17. The operation method of claim 15 further comprising:

determining whether the word is successfully stored in the one of the plurality of redundant data storage units in the first column after the word is written into the one of the plurality of redundant data storage units in the first column.

18. The operation method of claim 17 further comprising:

writing the word into another one of the plurality of redundant data storage units in the first column when the word fails to be written into the one of the plurality of redundant data storage units in the first column; and storing a row address representative of the unwritable one of the plurality of data storage units in another one of the plurality of redundant address storage units in the third column.

19. The operation method of claim 8, the step of recording the row address representative of the substituted one of the plurality of data storage units in the one of the plurality of redundant address storage units in the third column comprises:

storing a row address representative of the unwritable one of the plurality of data storage units in one of the plurality of redundant address storage units in the third column.

20. The operation method of claim 8 further comprising:

determining whether the one of the plurality of redundant data storage units in the first column is unused and undamaged before the word is written into the one of the plurality of redundant data storage units in the first column; or determining whether the unwritable one of the plurality of data storage units has been substituted successfully before the word is written into the one of the plurality of redundant data storage units in the first column.

\* \* \* \* \*